Jan. 25, 1966  R. E. LANE ETAL  3,231,670
REMOTE METER READING APPARATUS
Filed Nov. 10, 1961  3 Sheets-Sheet 1
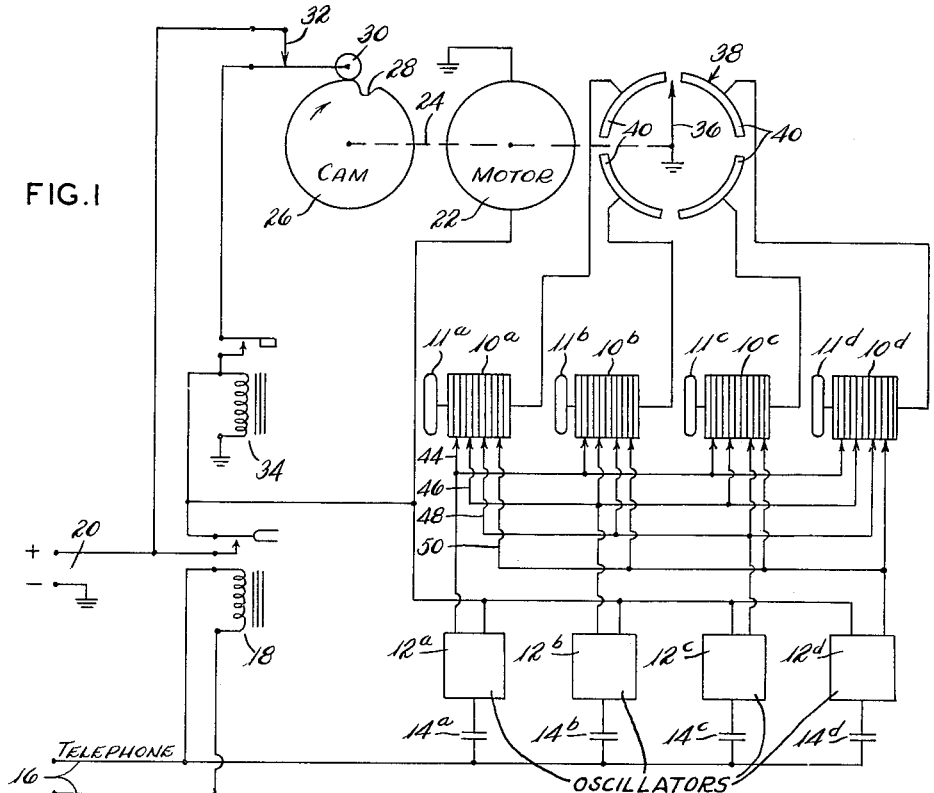
FIG.1
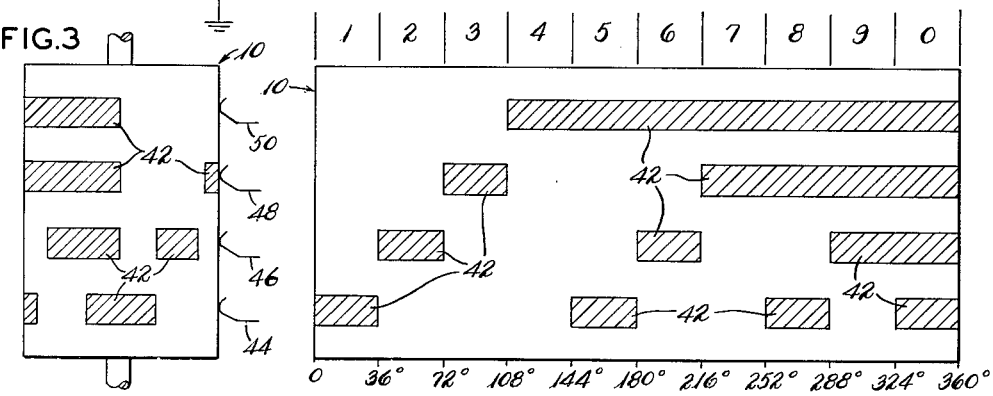
FIG.3
FIG.5
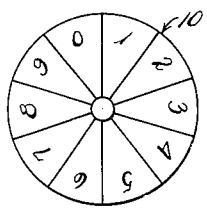
FIG.4
INVENTORS
ROBERT E. LANE
BY RICHARD L. BURTNER
Oldham & Oldham
ATTYS Jan. 25, 1966    R. E. LANE ETAL    3,231,670
REMOTE METER READING APPARATUS
Filed Nov. 10, 1961    3 Sheets-Sheet 2

INVENTORS
ROBERT E. LANE
BY RICHARD L. BURTNER
Oldham & Oldham
ATTYS.

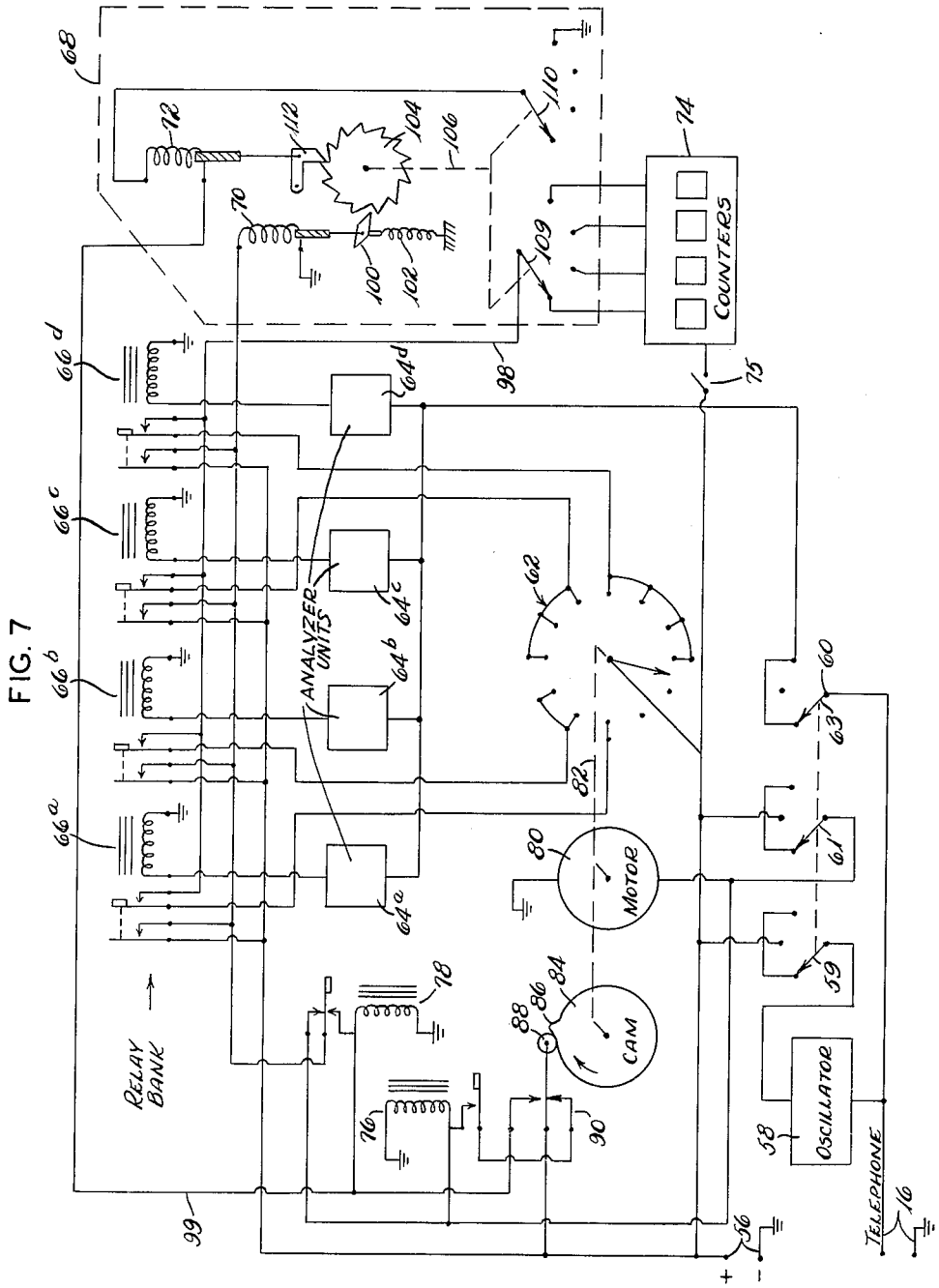

_United States Patent Office_

3,231,670
Patented Jan. 25, 1966

3,231,670
REMOTE METER READING APPARATUS
Robert E. Lane, 1418 Oxford Ave. NW., and Richard L. Burtner, 2925 Parkridge Circle, both of Canton, Ohio
Filed Nov. 10, 1961, Ser. No. 151,545
12 Claims. (Cl. 179—2)

This invention relates to apparatus for reading at a central office, and via conventional telephone lines, utility or other meters, such as gas, electric, and water meters, or other machines, dials or gages, located at a remote station, such as individual homes.

For many years it has been the standard practice to read home utility meters by having an agent of the utility company call at each individual home and read the meter. This is a relatively slow and expensive operation, particularly when the meters are read monthly. Some thought has been given, heretofore, to reading meters automatically, but this has usually resulted in proposals of relatively complicated and expensive equipment which do not appear to be commercially feasible.

It is the general object of the present invention to avoid and overcome the foregoing and other difficulties of and objections to prior art practices by the provision of an improved, relatively simple and inexpensive apparatus which is substantially foolproof and long-lived with little or no service, and which utilizes the existing telephone lines to substantially automatically read multi-dialed utility meters or similar devices located at a distance from a central station.

Another object of the invention is to provide apparatus of the character described wherein relatively small and inexpensive additions only are required on each dial of the utility meter, and only a small and inexpensive mechanism is required in addition at each utility meter.

Another object of the invention is to provide tone generating mechanism at each utility meter responsive to the position of each dial of the meter together with switching mechanism for examining each dial of the meter in turn.

Another object of the invention is the provision of mechanism at the central station including a multi-digit counter together with means for converting tone generated signals received from the meter station into pulses for actuating the counter, and switching mechanism for connecting the converting mechanism in turn to each of the several digits of the counter.

The foregoing objects of the invention, and other objects which will become apparent at the description proceeds, are achieved by providing in combination, a multi-dial utility meter, position sensing means on each dial, audio tone generating means responsive differently for each setting of the sensing means, means for transmitting to a distance the output of the audio tone generating means, a multi-digit counter located at said distance, means at said distance for converting the transmitted output of the audio tone generating means to position a digit of the counter to the numerical position of a dial of the meter, and switching means for sequentially connecting the audio tone generating means to the position sensing means of the dials of the meter and for connecting the corresponding digits of the counter to the converting means.

For a better understanding of the invention reference should be had to the drawings wherein FIG. 1 is a diagrammatic illustration of a typical apparatus of the invention and adapted to be located at the remote station in association with the meter to be read;

FIG. 3 is a side elevation of a sensing drum incorporated with each dial of a utility meter, such dials being shown in FIG. 1;

FIG. 4 is an end elevation of the sensing drum of FIG. 3;

FIG. 5 is a development of the surface of the drum of FIG. 3;

FIG. 7 is a diagrammatic wiring diagram of the apparatus located at the central station;

_Remote station apparatus_

Figure 2:
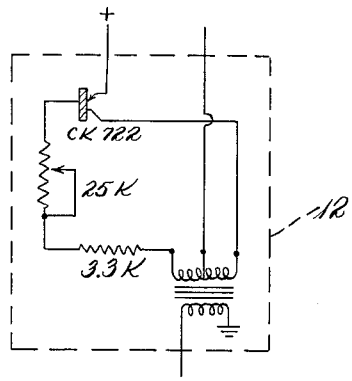
FIG. 2 is a schematic wiring diagram of a typical oscillator used in the apparatus of FIG. 1.

Referring more particularly to FIG. 1 of the drawings, each remote station apparatus includes a sensing drum 10 adapted to be attached to each dial 11 of a multi-dial utility meter. These drums, of which there are four in a standard four-dial meter, serve to provide an electrical indication of the rotary position of and hence the registering number position of each dial of the meter. The sensing drum 10 will be hereinafter described in greater detail in conjunction with FIGS. 3 to 6 of the drawings. For assistance in identification the plurality of drums 10 have been marked 10a, 10b, 10c and 10d, and the plurality of dials 11 by 11a, 11b, 11c, and 11d.

Electrically connected in the circuitry of the apparatus at the remote station are a plurality of oscillators 12, typically four in number, and identified as 12a, 12b, 12c, and 12d, each oscillator being adapted to generate a different frequency wave form or audio frequency tone, the number of tones generated being responsive to and an indication of the position of each sensing drum 10. The invention contemplates having a different oscillator for each one of the zero to nine positions of a sensing drum, but this means that ten differently tuned oscillators would be required. Accordingly, preferably the invention utilizes only four oscillators 12, with different combinations of these oscillators being used to indicate any one of the ten positions of each sensing drum, all as hereinafter set forth.

A typical oscillator circuit is shown in FIG. 2 of the drawings comprising the components therein indicated and connected as shown. However, it is to be particularly understood that FIG. 2 is by way of example only, and that any comparable known oscillator circuit can be utilized.

Electrically connected to the output of each oscillator 12 is a coupling device, such as a condenser or transformer 14, identified more particularly as 14a, 14b, 14c and 14d, and the outputs of these are connected, as illustrated, to a telephone line 16 running from the remote station to the central station. Before leaving the matter of the telephone line 16, it should be here noted, that in the operation of the apparatus the operator at the central station will normally dial the telephone where the utility or other meter to be read is located, and when the telephone is answered, the operator will ask that the telephone line be left clear for five seconds, with the receiver on the hook, so that the meter can be read. The line stays open to the number dialed even after the receiver is placed back on the hook. This procedure establishes the telephone line connection between the central station and the remote station and allows the apparatus to function as more fully described herein.

Once the telephone line connection has been established in the manner set forth, it is now necessary for the operator at the central station to initiate the operation of the apparatus at the remote station. This is achieved by the operator at the central station sending out an audio frequency tone. A relay 18 at the remote station is responsive to this tone only and momentarily closes to electrically connect a power supply 20 at the remote station to a relay 34 and motor 22. This motor will be energized so that its output shaft 24 is driven through one complete revolution and then is automatically stopped. The one revolution of the motor shaft 24 completes the scanning or electrical examination of each sensing drum 10 in turn, the electrical indication of the position of each sensing drum being sent back over the telephone line 16 to the central station.

More specifically, the motor shaft 24 has a detent cam 26 mounted thereon, this cam having detent 28 therein which cooperates with the roller 30 of a switch 32 to stop the operation of the remote station apparatus after one complete revolution of the shaft 24. Electrically connected to the switch 32 in the manner illustrated is a self-latching relay 34 which closes upon the momentary actuation of the relay 18 to thereby hold in operation the motor 22 for one complete revolution of the motor shaft 24, and until such time as the roller 30 of switch 32 falls into detent 28 of cam 26 to thereby temporarily interrupt the flow of electric current to the relay 34 thereby opening the relay and stopping the operation of the apparatus. Even though the electric current to the motor 22 is shut off in the manner described, the coasting of the motor 22 to a stop causes cam 26 to override slightly and to bring roller 30 just out of the detent 28 and close switch 32 to leave the apparatus in position for a subsequent reading operation at a later time.

Likewise connected to the motor shaft 24 is the rotary arm 36 of a switch 38 having spaced arcuate contacts equal in number to the number of dials on the meter. In a typical meter with four dials the switch 38 has four quadrants 40, each quadrant being attached electrically to a sensing drum 10 in the manner illustrated, and so that in one revolution of the motor shaft 24, each of the sensing drums 10 is in turn connected electrically in the circuit. The spacing between the quadrants 40 is slightly greater than the width of the switch arm 36 so that the electric circuit to the oscillators is momentarily broken as the switch arm 36 passes from one quadrant 40 to the next. This break in the electric current flow indexes the mechanism at the central station to indicate that the next sensing drum and dial at the meter of the remote station is being examined.

Dial position sensing drums

Each sensing drum 10, as best illustrated in FIGS. 3 to 6, is so constructed that it can readily be associated with each dial of the multi-dial utility or other meter and the sensing drum conveniently takes the form of a cylindrical drum as shown in side elevation in FIG. 3 and in end view in FIG. 4 of suitable insulating material, the drum bearing on its surface electroconductive metal strips 42 positioned in the manner best illustrated in FIG. 5 which is the development of the drum surface. As therein shown, the drum surface of 360 degrees is divided into ten areas, each 36 degrees in circumferential length, the divisions being shown in degrees along the bottom edge of FIG. 5, and as numerical numbers from 1 to 0 along the top edge of the drawing. Along the drum of FIG. 3 are spring metal contacts 44, 46, 48, and 50 which make contact with the four spaced rows of contacts 42 during the rotation of the drum. The arrangement is such that during the rotation of the drum 10 on segment 1 of the drum only contact 44 is energized, at segment 2 of the drum only contact 46 is energized, at segment 3 only contact 48 is energized, at segment 4 only contact 50 is energized, at segment 5 contacts 44 and 50 are energized, at segment 6 contacts 50 and 46 are energized, at segment 7 contacts 50 and 48 are energized, at segment 8 contacts 50, 48, and 44 are energized, at segment 9 contacts 50, 48, and 46 are energized, and at segment 0 all four contacts are energized.

By constructing the sensing drums 10 in the manner described and with each sensing drum 10 being connected to a dial of the utility meter, the sensing drum accurately transmits through one or more of the oscillators 12 an audio frequency tone or tones indicative of the numerical position of the meter dial. As stated before, a separate tuned oscillator could be used with a separate contact to produce a separate tuned wave for each numerical position of the meter dial but then ten separate oscillators would be required. Under the system as above described and used in the invention only four oscillators are used.

Figure 6:
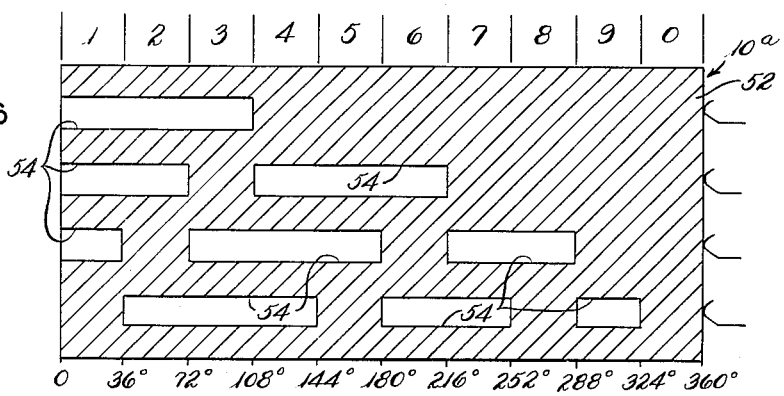
FIG. 6 is a view similar to FIG. 5 but illustrating another manner of forming the contacting means on the sensing drum of FIG. 3.

FIG. 6 illustrates an alternative form that the development of the surface of the drum 10 can take, the surface of the drum indicated by the numeral 52 being made conductive and having cut-out portions 54 which are nonconductive, with the same result that one or more of the oscillators 12 are activated to give a numerical representation from 1 through 0, thereby indicating the numerical position of the meter dial with which the drum is associated.

Central station apparatus

The apparatus located at the central station is shown in FIG. 7 and is connected to the telephone line 16 and to a power supply 56. The apparatus includes an oscillator 58, a three-pole, three-way switch 60, a twelve-pole rotary switch 62, analyzer units 64, designated as 64a, 64b, 64c, and 64d, equal in number to the number of oscillators 12 at each remote station, relays 66 in the same number, designated 66a, 66b, 66c, and 66d, a stepping switch 68 of a two-pole (poles 109 and 110) multi-throw type and having operating coil 70 and release coil 72, a multi-digit counter 74 and relays 76 and 78.

The counter 74 is of the known type wherein each digit or digit wheel can be advanced one number by an electric pulse and each digit wheel can be connected separately in an electric circuit. The stepping switch 68 is of the type wherein the breaking of the current to the stepping mechanism causes the switch to step.

Completing the mechanism at the central station is a motor 80 for rotating the switch 62 by way of the motor shaft 82, one rotation of the motor shaft 82 effecting one complete rotation of the switch 62. Also connected to the motor shaft 82 is a cam 84 having a tooth 86 contacting the roller 88 of a micro-switch 90. The various parts of the apparatus are electrically connected in the manner shown, and are operative in the manner hereinafter described.

Analyzer unit

Figure 8:
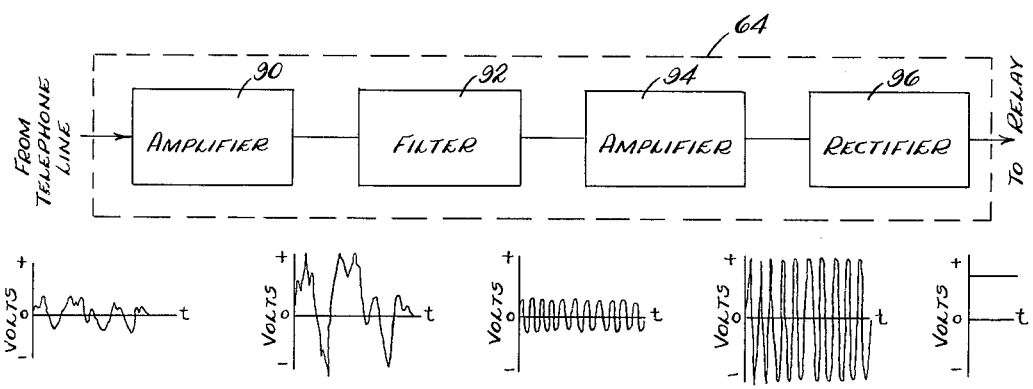
FIG. 8 is a more complete showing of the mechanism contained in each amplifier box in the apparatus of FIG. 7, together with a showing of the electrical wave forms existing between each one of the boxes of FIG. 8.

Each analyzer unit 64 is tuned by its filter 92 (FIG. 8) to respond to only a single oscillator 12 (FIG. 1) at the remote station, and FIG. 8 illustrates that each analyzer unit 64 normally comprises an amplifier 90, a filter 92 an amplifier 94, and a detector 96 tuned to result in the acceptance and passage of only a relatively narrow frequency range as produced by one of the oscillators 12. Associated with the block diagram of FIG. 8 are wave forms of the input signal, and the output signal, and the signals between the boxes.

Operation

Once the telephone connection has been established between the central station and the remote station, as heretofore described, the operator at the central station throws switch 60 from the left-hand position shown to the right-hand position. The left-hand pole 59 of switch 60 during this movement momentarily energizes oscillator 58 to generate an audio frequency tone of a character to close relay 18 at the remote station to initiate the operation of the remote station apparatus, as heretofore described. The movement of the second pole 61 of switch 60 over the central contact thereof momentarily energizes self-latching relay 76 and initiates the operation of the motor 80 at the central station and the rotation of cam 84 and switch 62. The oscillator 58 has initiated the operation of the apparatus at the remote station and reply tones from the remote station coming back over the telephone line 16 are only applied to the analyzer units 64a, 64b, 64c, and 64d through the isolated third pole 63 of switch 60 and the third contact thereof.

It will be understood that an output signal results at the first analyzer 64a if the first oscillator 14a is operating, an output signal results from the second analyzer 64b only if the second oscillator 12b is operating, and so on. If the analyzer 64 produces an output voltage this voltage operates the relay 66 associated with each analyzer and thereby connects via electric lead 98 to the first digit of the counter 74. The switch 62 then acts as a pulser as the switch 62 is rotated by the motor 80 to advance the digit of the counter 74 to a numerical position equal to that of the first meter dial.

More specifically, if only the first relay 66a has been activated only a single pulse arrives at the counter 74; if only the second relay 66b has been actuated, two pulses arrive at the counter 74; and so on up to simultaneous activation of all four relays at which time ten pulses are fed by the switch 62 via electric lead 98, to the counter 74. Thus, the first digit of counter 74 is stepped forwardly one number by each pulse to produce on the first digit of the counter 74 a number which is the equivalent of the number appearing on the first dial of the utility meter.

At the end of the first rotation of the motor shaft 82, the tooth 86 on the cam 84 operates the microswitch 90 to break the electric circuit to relay 76 and thence to the motor 80 which is stopped. At the same time the opening of the microswitch 90 closes momentarily a pulse of electric current via lead 99 to coil 72 of the stepping switch 68, but this does not operate the coil 72 for the reason that the other side of the coil 72 is connected to the second pole 110 of the stepping switch, this pole being positioned at the first contact, which is open.

Lead 99 likewise momentarily provides a pulse of electric current to the relay 78, as the microswitch 90 is operated, and the relay 78 closes and holds so long as one or more of the relays 66 is energized.

The speed of the motor 80 at the central station is arranged to make one complete revolution in less time than it takes the motor 22 at the remote station to make one-quarter a revolution of the motor shaft 24, so that each dial or drum 10 at the remote station is read and transmitted to the central station well before the contact 36 of switch 38 at the remote station moves to the next quadrant 40 to begin the reading of the next sensing drum 10. As the switch 38 transfers from one quadrant 40 to the next at the remote station, a momentary dead space is encountered dropping out all transmission of audio frequency tones from the remote station to the central station. This momentary dead space, with no output of the analyzer units 64, causes all relays 66 to drop open, and this in turn causes relay 78 to open, causing the loss of current to solenoid coil 70 in stepping switch 68 with the spring 102 of the stepping switch then pulling pawl 100 downwardly one tooth of ratchet wheel 104 thereby rotating shaft 106 and advancing both poles 109 and 110 of the stepping switch to the next contact. The next contact of pole 109 is connected to the second digit of the counter 74 to thereby set up the central station for the reception of the information from the second sensing drum connected to the second dial on the utility meter.

Now when the contact arm 36 of switch 38 at the remote station engages the next quadrant 40, one or more of the oscillators or tone generators 12 are again activated via the position of the drum 10 and the corresponding relays 66 are actuated back at the central station. This applies voltage via relay 78 to the motor 80 and to relay 76 which again closes and latches. The cycle then repeats except that now the pulses being generated by pulsing switch 62 are fed via lead 98 to the second digit on the counter 74, the number of pulses, of course, being dependent upon the number of relays 66 which have been closed.

The above-described action takes place four times, i.e. the number of meter dials to be read, giving a reading on the digits of the counter 74 at the central station which is identical to the reading on the utility meter at the remote station. At the end of the fourth cycle, the second pole 110 of the stepping switch 68 is on the fourth contact which grounds one end of the solenoid 72. Thus when the microswitch 90 is operated by the tooth 86 on cam 84 the pulse of electric current applied to the solenoid 72 lifts the ratchet 112 away from the ratchet wheel 104 to thereby cause the resetting of the stepping switch 68 (under the action of its return spring—not shown) to the initial position of the poles 109 and 110. The counter 74 is reset by the operator momentarily closing switch 75.

Nothing now happens at either the remote or central stations, the reading is completed, and the operator at the central station breaks the telephone connection between the stations. Thereafter, the entire operation can be repeated by the operator at the central station dialing a new telephone number of a remote station where the meter is to be read, and once the telephone connection is completed then the operation of the apparatus at the central station and at the remote station is initiated by the operator at the central station throwing the switch 60 completely to the left and the operation heretofore described is repeated.

Should it be advisable in the apparatus of the invention to read more than four dials it is only necessary to add more relays and analyzers to the apparatus and to correspondingly increase the number of contacts 40 on switch 36.

The term utility meter as employed in the specification and claims is intended to include other meters, dials, gages or machines having a plurality of dials, shafts or the like whose positions are to be determined from a distance.

Briefly describing the operation of the apparatus of FIG. 8, and comprising each analyzer unit 64, the incoming wave from coming into each amplifier 90 consists of combinations of the tones from the remote unit. These are amplified by mechanism 90 and the output is passed in the amplified wave form shown to a narrow band filter 92 which selects out the particular frequency component which corresponds to one of the oscillators 12 at the remote unit. The resulting wave form output is then amplified at 94 and the amplified wave form shown is then rectified by means 96 to give an output D.C. voltage sufficient to actuate one of the relays 66 in the bank of relays at the central station.

Figure 9:
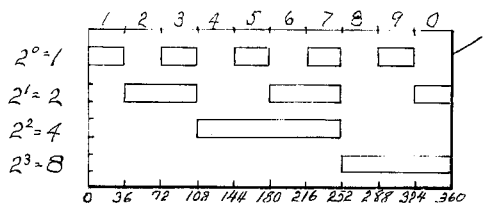
FIG. 9 is a view similar to FIG. 5 but showing a binary system drum.

The modification of the invention shown in FIG. 9 is a development of a sensing drum 10b for use with a binary code system. A binary system using only four signals could be used. In a binary system the pulser 62 at the central station must be capable of producing fifteen pulses instead of ten.

It will be understood that the sensing drums 10, 10a and 10b can be made in the form of wheels or discs, rather than drums, and that the apparatus of the invention provides the absolute minimum of equipment (oscillators, etc.) as the sum of 1+2+3+4=10. Thus any digit can be represented by only four signals, or combinations thereof.

While a certain representative embodiment and details have been shown for the purpose of illustrating the invention, it will be apparent to those skilled in this art that various changes and modifications may be made therein without departing from the spirit or scope of the invention.

What is claimed is:

1. In combination, a multi-dial utility meter, position sensing means on each dial, means to set the position of the sensing means on each dial audio tone generating means which generates one or more tones simultaneously and which is responsive differently for each setting of the sensing means, means for transmitting to a distance the output of the audio tone generating means, a multi-digit counter located at said distance, electrical means at said distance responsive to each tone generated by the audio tone generating means for automatically converting the transmitted output of the audio tone generating means to position a digit of the counter to the numerical position of a dial of the meter, and switching means for sequentially connecting the audio tone generating means to the position sensing means of the dials of the meter and for connecting the corresponding digits of the counter to the converting means.

2. In an apparatus the combination, a multi-dial utility meter of switching means on each dial, wave generating means responsive differently for each setting of the switching means, means for transmitting to a distance the output of the wave tone generating means, a multi-digit counter located at said distance, means at said distance for converting the transmitted output of the wave tone generating means to position a digit of the counter to the numerical position of a dial of the meter, additional switching means for sequentially connecting the wave tone generating means to the switching means of the dials of the meter and for connecting the corresponding digits of the counter to the converting means, trigger means at the meter, and signal means at said distance for firing the trigger means to initiate the operation of the apparatus.

3. In combination, a sending station, a multi-dial meter at the sending station, position sensing means on each dial, means to set the position of the sensing means on each dial audio tone generating means responsive differently with one or more tones simultaneously for each setting of the sensing means, a receiving station means for transmitting to said receiving station the output tones of the audio tone generating means, a multi-digit counter located at said receiving station, means at said receiving station for converting the transmitted output of the audio tone generating means to position the digits of the counter to the numerical position of the dials of the meter.

4. In combination, a multi-dial meter, a ten-position sensing means on each dial, four audio tone generating means responsive with different single or tone combinations for each setting of the sensing means, means for transmitting to a distance the output of the audio tone generating means, a multi-digit counter located at said distance, means at said distance for converting the transmitted output of the audio tone generating means to position a digit of the counter to the numerical position of a dial of the meter, and switching means for sequentially connecting the audio tone generating means to the position sensing means of the dials of the meter and for connecting the corresponding digits of the counter to the converting means.

5. In combination, a multi-dial utility meter at a remote station, a central station, telephone lines connecting the remote station and the central station, manually initiated triggering means at the central station, means at the remote station responsive to the triggering means, mechanism at the remote station set into operation by the responsive means, said mechanism including means for electrically indicating the numerical position of each dial of the utility meter sequentially in turn and for transmitting this as a tone or tone combination over the telephone lines, an electrically operated multi-digit counter at the central station, mechanism at the central station set into operation by the triggering means, said mechanism including means for converting the electrical indications of the numerical position of each dial of the meter into the movement of each digit of the counter to a corresponding numerical position, last said means including switching means to sequentially change to the proper dial indication before that dial indication is sent as its electrical indication, and means for disconnecting the remote station and the central station mechanism upon completion of the meter reading operation.

6. In combination, a multi-dial utility meter at a remote station, a central station, telephone lines connecting the remote station and the central station, manually initiated triggering means at the central station, means at the remote station responsive to the triggering means, mechanism at the remote station set into operation by the responsive means, said mechanism including means for electrically indicating the numerical position of each dial of the utility meter and for transmitting this over the telephone lines, switch means for electrically connecting said last-named means in turn to each dial of the utility meter, an electrically operated multi-digit counter at the central station, mechanism at the central station set into operation by the triggering means, said mechanism including means for converting the electrical indications of the numerical position of each dial of the meter into the movement of each digit of the counter to a corresponding numerical position, switch means synchronized with the switch means at the remote station for connecting the last-named means in turn with each digit of the counter, and means for disconnecting the remote station and the central station mechanism upon completeion of the meter reading operation.

7. The combination in apparatus for reading a multi-dial utility meter at a remote station over a telephone line from central station, of means for generating at the central station an audio frequency tone and for applying it to the phone line, switch means at the remote station closed by the reception of the tone, a one revolution motor shaft energized by the closing of the switch means and automatically opening the switch means upon completion of the one revolution, a sensing drum on each of the meter dials and having a plurality of contacts thereon, a plurality of oscillators each producing a wave of different frequency means connecting an oscillator to each contact of the drum whereby a selected number of oscillators are energized at each rotary position of each drum, a quadrant switch rotated by the motor and connecting each drum in turn to the oscillators, means connecting the output of the oscillators to the phone line, and at the central station a pulse actuated counter, a stepping switch connecting in turn to each digit of the counter, a plurality of relay and analyzer means equal in number to the oscillators and each adapted to close in response to a separate frequency generated by a specific oscillator, switch means connecting the relay and analyzer means to the phone line, pulse producing means connected through the relay and analyzer means and the stepping switch to each digit of the counter, means for advancing the stepping switch to the next digit of the counter in response to the movement of the quadrant switch to the next quadrant and for again actuating the pulse producing means, and means for opening the switch means at the central station and for returning the stepping switch to its initial position once the motor shaft at the remote station has has completed the rotation of the quadrant switch, 8. The combination in apparatus for reading a multi-dial meter at a remote station over a telephone line from a central station, each dial of the meter having ten digits, of means for generating at the central station an audio frequency tone and for applying it to the phone line, switch means at the remote station closed by the reception of the tone, a one revolution motor shaft energized by the closing of the switch means and automatically opening the switch means upon completion of the one revolution, a sensing drum on each of the meter dials and having four rows of contacts thereon, four oscillators each producing a wave of different frequency, fixed contact means adapted to slidably connect an oscillator to each row of contacts of the drum whereby a selected number of oscillators are energized at each rotary position of each drum, an arcute switch rotated by the motor and connecting each drum in turn to the oscillators, means connecting the output of the oscillators to the phone line, and at the central station a pulse actuated counter, a stepping switch connecting in turn to each digit of the counter, four relay and analyzer means each adapted to close in response to a separate frequency generated by a specific oscillator, switch means connecting the relay and analyzer means to the phone line, pulse producing means connected through the relay and analyzer means and the stepping switch to each digit of the counter, means for advancing the stepping switch to the next digit of the counter in response to the movement of the arcuate switch to the next arcuate portion and for again actuating the pulse producing means, and means for opening the switch means at the central station and for returning the stepping switch to its initial position once the motor shaft at the remote station has completed the rotation of the arcuate switch.

9. The combination in apparatus for reading a multi-dial meter at a remote station over a telephone line from a central station, of means for generating a signal at the central station and for applying it to the phone line, switch means at the remote station closed by the reception of the signal, a one revolution motor shaft energized by the closing of the switch means and automatically opening the switch means upon completion of the one revolution, a ten position sensing drum on each of the meter dials and having four rows of contacts thereon, four oscillators each producing a wave of different frequency, fixed contact means adapted to slidably connect an oscillator to each row of contacts of the drum whereby a selected number of oscillators are energized at each rotary position of each drum, an arcuate switch rotated by the motor and connecting the output of each drum in turn and the oscillators switched on by the drum to the phone line, and at the central station a pulse actuated counter, a stepping switch connecting in turn to each digit of the counter, four relay and analyzer means each adapted to close in response to a separate frequency generated by a specific oscillator, switch means connecting the relay and analyzer means to the phone line, pulse producing means connected through the relay and analyzer means and the stepping switch to each digit of the counter, and means for advancing the stepping switch to the next digit of the counter in response to the movement of the arcuate switch to the next arcuate portion and for again actuating the pulse producing means.

10. In combination, a multi-dial meter, tone generating signal means responsive to the position of each dial of the meter where at least half the tones generated are multiple combinations, means for switching the tone generating signal means in turn to each dial of the meter, a pulse-actuated multi-digit counter remote from the meter, means at the counter for receiving and converting the tone generated signals into pulses for actuating the counter, switching mechanism for connecting the converting means sequentially to each of the several digits of the counter, and means for synchronizing the movement of the means for switching and the switching mechanism.

11. The combination in apparatus for reading a multi-dial meter at a remote station over the telephone line from a central station, each dial of the meter having ten digits thereon, means at the remote station for examining a dial and for operating, depending upon the digit position of the dial, any or all of four separate frequency generating oscillators forming a part of the means, means at the central station responsive to the number of oscillators actuated at the remote station for positioning the first digit wheel of a counter forming part of the means so that the digit shown thereby coincides with the digit shown by the meter dial examined at the remote station, switches at the remote station and at the central station for connecting the examining means to each dial in turn at the remote station and for connecting the responsive means to each digit wheel in turn of the counter at the central station, trigger means at the remote station, and signal means at the central station for firing the trigger means to initiate the operation of the apparatus.

12. The combination in apparatus for reading a multi-dial meter at a remote station over the telephone line from a central station, each dial of the meter having ten digits thereon, means at the remote station for examining a dial and for operating, depending upon the digit position of the dial, any or all of four separate frequency generating oscillators forming a part of the means, means at the central station responsive to the number of oscillators actuated at the remote station for positioning the first digit wheel of a counter forming part of the means so that the digit shown thereby coincides with the digit shown by the meter dial examined at the remote station, and switches at the remote station and at the central station for connecting the examining means to each dial in turn at the remote station and for connecting the responsive means to each digit wheel in turn of the counter at the central station.

References Cited by the Examiner

UNITED STATES PATENTS

| | | | |
|---|---|---|---|
| 1,889,597 | 11/1932 | Fitzgerald | 340—180 |
| 1,902,465 | 3/1933 | Pratt | 179—2 |
| 2,302,081 | 11/1942 | Weitman | 340—171 |
| 2,784,393 | 3/1947 | Schultheis | 179—84 |

OTHER REFERENCES

Electronics, "Frequency-Code Telemetering System," April 1954; pages 172–176.

DAVID G. REDINBAUGH, *Primary Examiner.*